(12) United States Patent  
Baltes et al.

(10) Patent No.: US 6,708,999 B1  
(45) Date of Patent: Mar. 23, 2004

(54) INDICATOR FOR A BICYCLE SUSPENSION SYSTEM FOR INDICATING TRAVEL OF THE SUSPENSION SYSTEM

(75) Inventors: Jeffrey J. Baltes, Colorado Springs, CO (US); Mark J. Norris, Colorado Springs, CO (US); Kevin F. Wesling, Lombard, IL (US)

(73) Assignee: SRAM Corporation, Chicago, IL (US)

( * ) Notice: Subject to any disclaimer, the term of this patent is extended or adjusted under 35 U.S.C. 154(b) by 0 days.

(21) Appl. No.: 10/065,941

(22) Filed: Dec. 2, 2002

(51) Int. Cl.[7] .............................................. B62K 25/06
(52) U.S. Cl. ...................... 280/276; 280/275; 280/279; 188/285; 267/64.11; 267/64.15
(58) Field of Search ................................ 280/275–277, 280/279, 283–286, 288; 188/266–290, 1.11 R; 267/113, 64.11, 64.15

(56) References Cited

U.S. PATENT DOCUMENTS 6,042,091 A * 3/2000 Marzocchi et al. ...... 267/64.15  
6,260,832 B1 * 7/2001 Vignocchi et al. ....... 267/64.15

* cited by examiner

*Primary Examiner*—Lesley D. Morris  
*Assistant Examiner*—L. Lum  
(74) *Attorney, Agent, or Firm*—Milan Milosevic; Lisa Wunderlich

(57) ABSTRACT

A bicycle suspension system that includes an indicator for displaying the travel of a bicycle suspension system in response to an applied load. The system includes an inner tube telescopically engaging with the outer tube along an axis. A biasing mechanism biases the inner and outer tube apart from each other along the axis. The indicator is disposed along a length of the inner and outer tubes. The indicator may include a plurality of markings on the inner tube and a pointer on the outer tube. Each marking corresponds to a distance that the inner and outer tubes may be displaced relative to each other. The suspension system may include an adjustment mechanism that adjusts the distance the inner and outer tubes may be displaced relative to each other in response to an applied load. The rider may select the desired travel by actuating the adjustment mechanism to align the marking corresponding to the desired travel with the pointer. The indicator allows the rider to easily determine and select the travel of the suspension system without having to use a separate measuring device.

7 Claims, 3 Drawing Sheets

INDICATOR FOR A BICYCLE SUSPENSION SYSTEM FOR INDICATING TRAVEL OF THE SUSPENSION SYSTEM

BACKGROUND OF INVENTION

This invention relates to a bicycle suspension system, and more particularly to a bicycle suspension system having an indicator for indicating the travel of the suspension system.

Bicycle suspension systems have been developed for cushioning impacts or vibrations experienced by the rider when the bicycle contacts bumps, ruts, rocks, pot holes, or other obstacles. Bicycle suspension systems may be configured for use in the front fork, rear frame assembly, in the head tube that connects the front fork to the bicycle frame and handlebars, in the seat post, in conjunction with a swing-arm assembly, or in any other position along the bicycle frame.

Typically, bicycle suspension systems include a pair of telescoping inner and outer tubes containing one or more biasing elements that oppose the compressive or expansive motion of the telescoping tubes. The biasing elements are typically devices such as coil springs, elastomer springs, and gas springs. The biasing elements may be placed within one or more of the tubes for biasing the tubes apart or toward each other. Using biasing elements in this way permits the tubes to compress in response to an impact or other applied forces, and expand or rebound once the force is removed, so that the inner and outer tubes return to their original spaced-apart positions relative to each other.

Bicycle suspensions systems may also include dampening systems to enhance the performance of the suspensions systems by damping the motion of the suspension system. The dampening systems generally use incompressible fluids such as hydraulic oil, water, fish oil, and glycerine, among others, or a combination thereof. The dampening systems act to absorb some of the energy of an impact or other force input causing compression or rebound of the tubes so that a more controlled response of the bicycle to force inputs may be achieved. Dampening systems may be used in combination with shock absorbing springs, which resist the compressive forces. In some systems, the primary elements of the spring structure may be in one leg of the suspension fork and the dampening system in the other leg.

The degree of suspension travel, or extent of maximum relative displacement between the tubes when subjected to external load, is dependent on a number of factors, including the path or terrain over which the bicycle is ridden, the characteristics of the dampening and spring systems being used, the bicycle speed, rider weight, and other factors. It is well known that during certain uses, damping and spring characteristics of the fork which are suitable and desirable for one terrain or set of riding conditions, may not be suitable or desirable for other terrains or conditions. Therefore, adjustability of the damping and/or spring characteristics of the bicycle suspension fork is important for the proper functioning of suspension systems.

Bicycle suspension systems have been provided to allow for internal or external adjustment of the travel of the fork. Internal travel adjust systems require disassembly of the suspension fork and insertion of the proper spring element(s) to achieve the desired travel. External travel adjust suspension forks eliminate the need to disassemble the fork. Some external adjust systems require adjustment before mounting the bike while others may be adjusted to best suit the particular terrain encountered during the course of the ride or "on the fly." This is an obvious advantage as during typical rides, a variety of terrain and riding conditions are encountered and the need to change the travel characteristics of the suspension may occur several times even during the same ride. For external adjustment, a knob may be provided at the top of the fork that may turned either clockwise or counterclockwise to actuate an adjustment device that increases or decreases the maximum possible travel of the suspension when subject to an external load. With this configuration, it is difficult to determine the actual travel selected by turning the knob without some type of indicator that corresponds with the travel selected. Generally, the only indication that is provided are plus/minus signs indicating the direction a knob should be turned in order to increase or decrease the travel. A problem with this indication is that it does not indicate the actual travel selected by the rider and a measuring device must be used to determine the selected travel. Therefore, it would be desirable to have an indicator that indicates the maximum travel selected by the rider without having to use a measuring device. It would also be desirable to visually show the stroke or relative displacement of the tubes of the suspension after a particular applied load.

SUMMARY OF INVENTION

It is therefore an object of the present invention to provide a bicycle suspension system having an indicator that allows the rider to visually select the desired travel of the suspension system.

Another object of the present invention is to provide an indicator that visually illustrates the stroke of the suspension system after an applied load.

The present invention provides a bicycle suspension system that includes an indicator for indicating the travel of a bicycle suspension system in response to an applied load. The system includes an inner tube telescopically engaged with the outer tube. A biasing mechanism, usually a spring assembly, biases the inner and the outer tubes apart from each other. So configured, the biasing mechanism resists compression of the tubes relative to each other in response to an applied load and rebounds the tubes apart when the applied load is removed. The suspension system may include an adjustment mechanism that allows the rider to preselect the desired travel of the suspension system. The indicator is provided on the tubes to allow a rider to visually determine and preselect the desired travel. The indicator may include a plurality of markings on the inner tube and a corresponding pointer on the outer tube. Each marking corresponds to a distance that the inner or outer tube may travel. The rider may select the desired travel by aligning the marking corresponding to the desired travel with the pointer on the outer tube. The indicator allows the rider to easily determine the travel of the suspension system without having to use a separate measuring device.

In one embodiment of the present invention, the adjustment mechanism may include a dial located at the top of the inner tube that is rotatable in a clockwise direction or a counterclockwise direction to increase or decrease the travel of the suspension. The adjustment mechanism may be operatively connected to the biasing mechanism such that upon rotation of the dial the inner and outer tubes are pulled apart or drawn together depending on the direction the dial was rotated. To select a desired travel, the rider turns the knob until the pointer on one of the tubes aligns with the marking on the other tube that corresponds with the desired travel. The indicator may also include a deflection guide that aligns with a marking in response to an applied load to show the stroke or actual distance traveled by the suspension for that particular applied load. A surface of the outer tube may form a seal with a surface of the inner tube. If the outer tube forms a seal with the inner tube, the markings must be applied to a tube surface such that they do not substantially interfere or break the seal between the inner and outer tubes during suspension loading.

These and other features and advantages of the invention will be more fully understood from the following description of certain specific embodiments of the invention taken together with the accompanying drawings.

DETAILED DESCRIPTION

Figure 1:
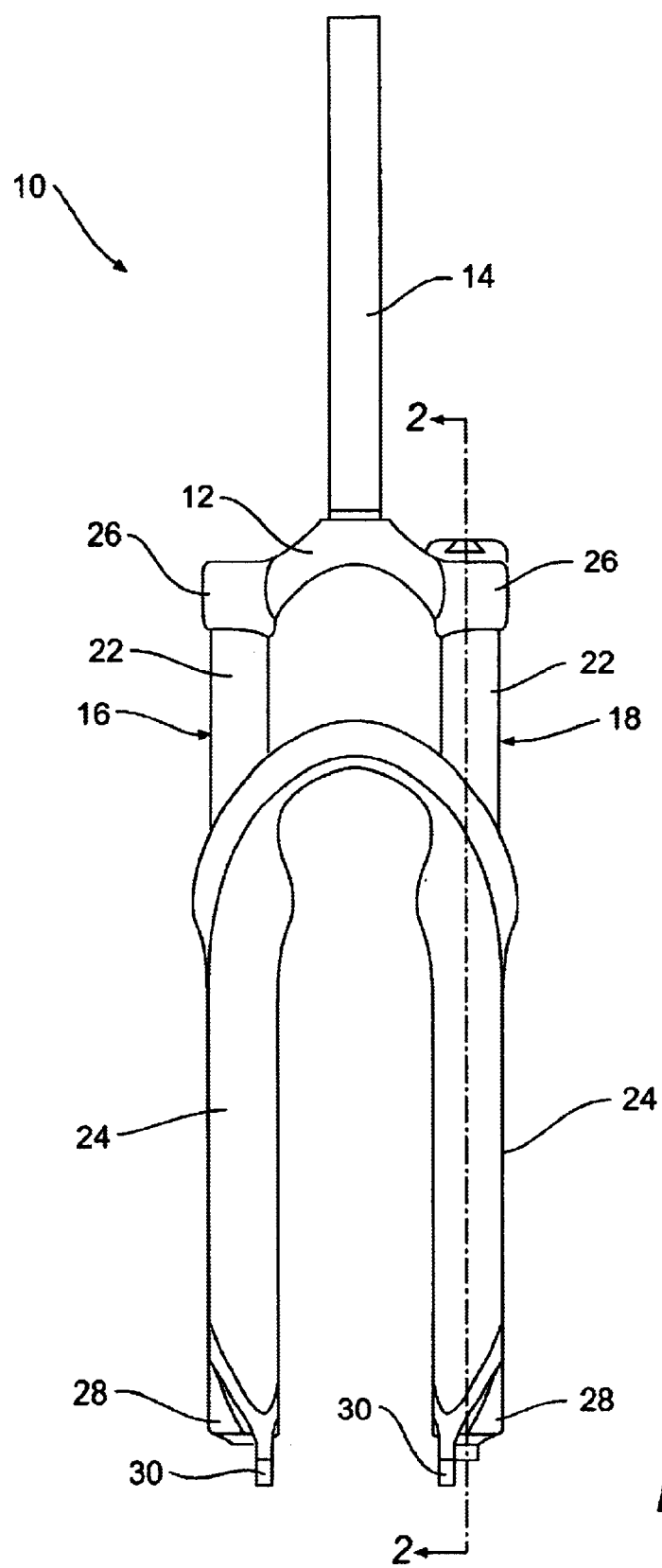
FIG. 1 is a front view of a bicycle suspension fork of FIG. 1 in accordance with one embodiment of the present invention.

The present invention is illustrated with reference to an embodiment of the invention depicted in FIGS. 1–3. The suspension system depicted is a bicycle front suspension fork 10 having a crown 12 that is connected with a steer shaft 14, a first leg 16 that may contain a damping mechanism, and a second leg 18 containing a biasing mechanism or a spring assembly 20. Each of the legs 16, 18 include an upper tube 22 and a lower tube 24. Although the upper tubes 22 are shown as inner tubes slidable within the lower outer tubes 24, it will be appreciated that the lower tubes may alternatively be configured as the inner tubes slidable within the reconfigured outer tubes. Although the tubes 22, 24 are shown to have a substantially circular cross section, it is understand that they may be configured to any cross-sectional shape. The inner and outer tubes 22, 24 are connected at their remote ends 26, 28 with the crown 12 and with the wheel axle (not shown) via an axle catch portion 30, respectively.

Figure 2:
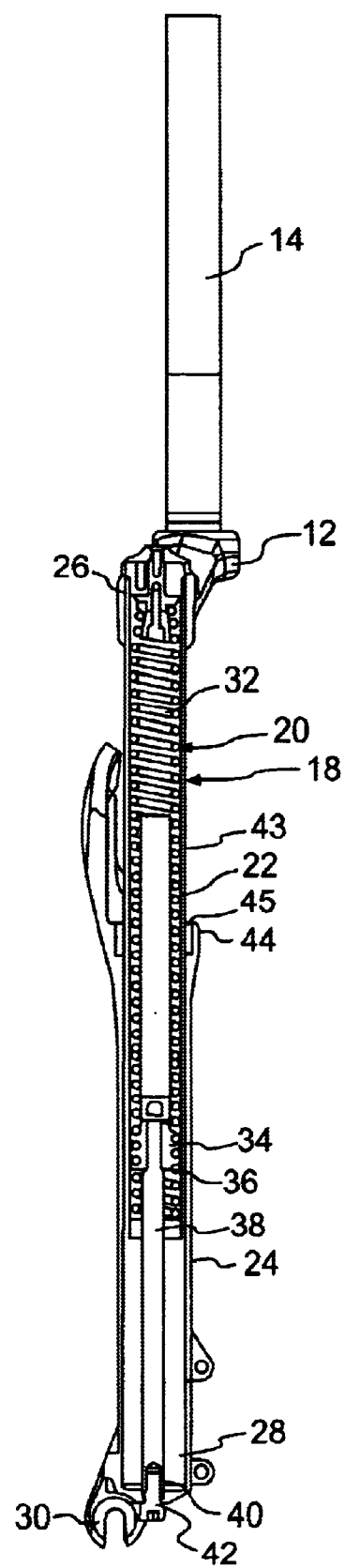
FIG. 2 is a cross-sectional side view taken along line 2—2 of a leg of the bicycle suspension fork of FIG. 1 containing a spring assembly.
Figure 3:
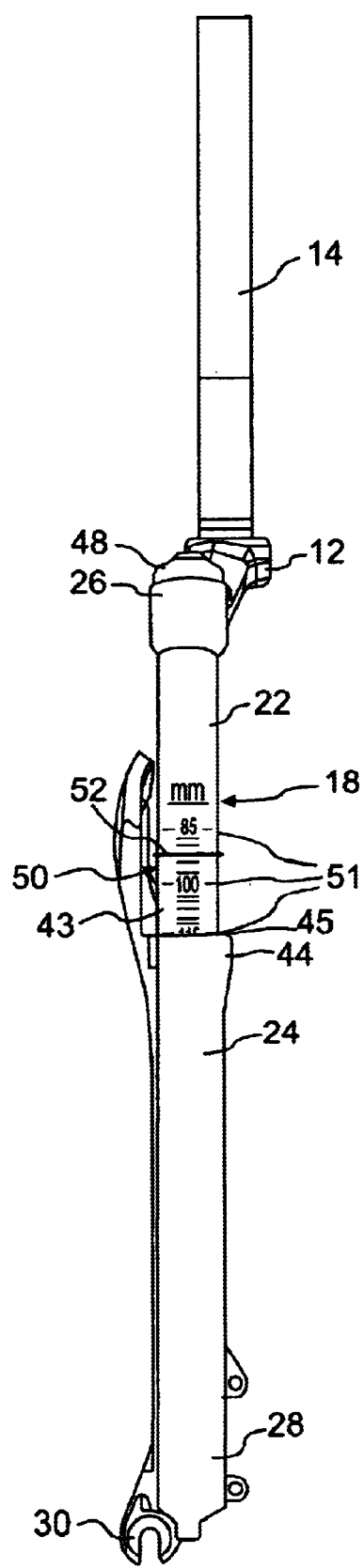
FIG. 3 is a side view of the leg of the bicycle suspension fork of FIG. 1 containing the spring assembly.

The spring assembly 20 is positioned within the inner and outer tubes 22, 24 to bias tubes 22, 24 apart from each other toward their neutral position as shown in FIGS. 1–3. In FIG. 2, the spring assembly 20 includes a compression spring 32 which preferably is a coil spring positioned in the inner tube 22. Other types of springs and spring assemblies may be used, including elastomeric springs, multiple coil springs and gas springs. The compression spring 32 provides a resistant force against a piston 34 which moves telescopically within the inner tube 22 when the inner tube 22 is compressed by an applied force. The piston 34 is attached on its lower surface 36 to a piston rod 38, which extends through the bottom portion of the inner tube 22 and exits the inner tube 22. At a bottom end 40 of the rod 38, the piston rod 38 is nonrotatably mounted to the outer tube 24 by a screw 42. A top end 44 of the outer tube 24 forms a seal 45 with an outer surface 43 of the inner tube 22.

In one embodiment of the present invention, the suspension system includes an adjustment mechanism 46 for adjusting travel of the fork. The travel of the fork is the maximum distance the inner tube 22 and outer tube 24 will be displaced relative to each other when subjected to an external load or force. Typically, fork travel may range from 85 millimeters to 125 millimeters. The adjustment mechanism 46 includes a knob or dial 48 located on the remote end or top end 26 of the inner tube 22 and is operatively connected to the compression spring 32. When the dial 48 is turned either clockwise or counterclockwise, the compression spring 32 rotates to pull apart or draw together the inner tube 22 and the outer tube 24, thereby changing the relative longitudinally distance between the inner tube 22 and the outer tube 24 at their neutral position. When the neutral position of the tubes 22, 24 is changed, the travel is varied. Further, by turning the dial 48 and rotating the spring 32, the spring rate or the force needed to compress the spring a certain distance, may change accordingly.

An indicator 50 is located on the inner tube to indicate the travel of the suspension system. The indicator includes a plurality of markings 51 disposed on the outer surface 43 of the inner tube 22 and a pointer (in this embodiment, an end 44 of the outer tube 24). Each marking 51 corresponds to a distance the inner tube 22 may displace relative to the outer tube 24 when subjected to an external load. The rider may select a maximum distance the inner tube 22 may travel relative to the outer tube 24 in response to an applied load by turning the dial 48 until the marking 51 on the inner tube 22, corresponding to the desired travel, aligns with the top end 44 of the outer tube 24. In this embodiment, the markings 51 are disposed on the outer surface 43 of the inner tube 22 such that they do not substantially interfere or break the seal 45 between the inner tube 22 and the outer tube 24 when the inner tube 22 slides within the outer tube 24. The indicator 50 provides the rider with a visual method of determining and selecting the maximum travel the fork will travel in response to an applied load without having to use a measuring device. In another embodiment of the present invention, the indicator 50 may include a deflection guide 52 disposed on the outer surface 43 of the inner tube 22 to indicate a stroke of the inner tube 22 for a particular applied load. The deflection guide 52 moves up and down the inner tube 22 after each applied load.

While this invention has been described by reference to a preferred embodiment, it should be understood that numerous changes could be made within the spirit and scope of the inventive concepts described. For example, the bicycle suspension has been depicted as a suspension fork but it can take the form of a rear shock, a seat post, or any other type of suspension positioned along the bicycle frame. Accordingly, it is intended that the invention not be limited to the disclosed embodiment, but that it have the full scope permitted by the language of the following claims.

What is claimed is:

1. A bicycle suspension system comprising:
   an outer tube;
   an inner tube telescopically engaged with said outer tube along an axis;
   a biasing mechanism for biasing said inner and outer tubes apart from each other along the axis; and
   an indicator disposed along a length of said inner and outer tubes for indicating
   a distance said inner and outer tubes may compress relative to each other in response to an applied load.

2. The bicycle suspension system of claim 1, further comprising an adjustment mechanism for adjusting the distance said inner and outer tubes may be displaced relative to each other in response to an applied load.

3. The bicycle suspension system of claim 2, wherein said indicator includes a plurality of markings on one of said inner and outer tubes, and a pointer on a second one of said inner and outer tubes, each of said markings corresponding to a distance said inner and outer tubes may displaced relative to each other in response to an applied load, said plurality of markings and pointer configured on said inner and outer tubes such that a desired distance that said inner and outer tubes may be displaced relative to each other is selectable by actuating said adjustment mechanism.

4. The bicycle suspension system of claim 2, wherein said biasing mechanism is a coil spring and said adjustment mechanism is operatively connected to the coil spring such that upon actuation of the adjustment mechanism the inner tube and outer tube may be reciprocate relative to each other on the axis.

5. The bicycle suspension system of claim 3, wherein a first surface of said inner tube sealingly engages a second surface of said outer tube during compression and rebound of said suspension system, the plurality of markings disposed on a first one of said first and second surfaces and the pointer disposed a second one of said first and second surfaces such that the seal between the inner and outer tubes is not substantially broken during compression and rebound of the suspension system.

6. The bicycle suspension system of claim 5, wherein the inner tube has an outer surface that forms a seal with an inner surface of the outer tube during compression and rebound of the suspension system.

7. The bicycle suspension system of claim 1, wherein the indicator includes a deflection guide for indicating a stroke of the suspension system in response to an applied load.

* * * * *